April 27, 1965  Z. MALKASIAN  3,180,010
METHOD OF MANUFACTURING AIR CLEANER ELEMENT
Filed Jan. 11, 1962
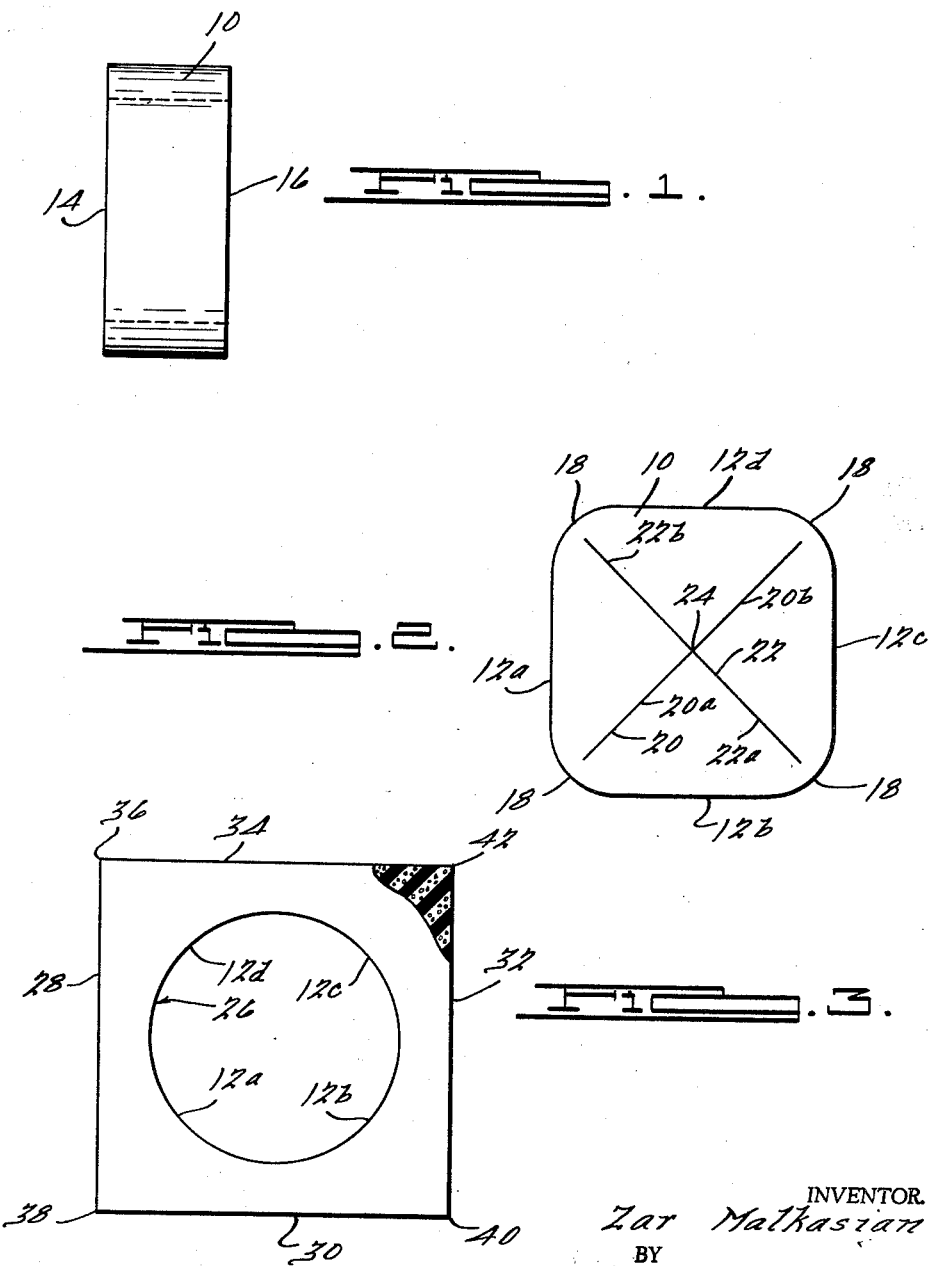
INVENTOR.
Zar Malkasian
BY
Harness, Dickey & Pierce
ATTORNEYS.

United States Patent Office 3,180,010
Patented Apr. 27, 1965

3,180,010
METHOD OF MANUFACTURING AIR CLEANER ELEMENT
Zar Malkasian, Detroit, Mich., assignor to Kelsey-Hayes Company, Romulus, Mich., a corporation of Delaware
Filed Jan. 11, 1962, Ser. No. 165,524
8 Claims. (Cl. 29—157)

This invention relates to a method for making an article of porous material having a large central opening and particularly to a method for making such an article for use as an air-cleaner element.

Among the objects of the present invention are the provision of a method for making a centrally open article of porous, compressible material which substantailly eliminates scrap loss in the formation of the opening, which is convenient and inexpensive, and which is effective to produce a strong and reliable product.

It is another object of the present invention to provide a method for making an air-cleaner element having a porous wall of varying thickness wherein the density of the thin portions of the wall is increased to more nearly equalize the filtering effectiveness of all portions of the wall.

Various pneumatic power systems, such as power brakes for vehicles, incorporate ports or openings through which air is drawn into or expelled from the system. Such ports or openings are frequently fitted with a porous air-cleaner element which permits the passage of air therethrough but which filters out dirt, dust and other contaminants and prevents their entry into the system. One such air-cleaner element in current use is cut from a rather thick sheet of porous material to a shape which is of square, external configuration and has a large, circular opening disposed centrally therein. The element is used so that air flows through a porous wall between the central opening and outer periphery in a radial direction.

In the formation of such air-cleaner elements it has heretofore been the practice to cut a sheet of the material directly into elements of the desired size. In view of the relatively large central aperture, this method has resulted in a large scrap loss. Foam rubber, foam polyurethane, and the other materials from which such air-cleaner elements are made are relatively costly, and the expense of such scrap has been significant. It will be seen that the method of the present invention substantially eliminates such scrap loss and permits the production of a greater number of elements from a sheet of material of a given size.

These and other objects of the present invention will become apparent from the following detailed description taken in conjunction with the accompanying drawings wherein:

FIG. 1 is a side elevational view of the blank which is initially cut in the practice of the method of the present invention, FIG. 2 is a front elevational view of the structure of FIG. 1, and FIG. 3 is a view of the final product formed from the blank of FIGS. 1 and 2.

In the method of the present invention a sheet of foam rubber, foam polyurethane, or other compressible porous material is cut to form a blank of a polygonal outer periphery, as, for example, the blank 10 illustrated in FIGS. 1 and 2. While the blank of FIGS. 1 and 2 has a square outer periphery, it is to be understood that other polygonal shapes such as hexagon could also be used to advantage. The blank 10 of FIGS. 1 and 2, however, will be seen to have an outer periphery consisting of four equal sides, 12a, 12b, 12c and 12d, that are of a width established by the distance between a pair of parallel faces 14 and 16 comprising the opposite sides of the sheet from which the blank 10 is cut. In the use of a square, the corners between the sides 12a, etc., are preferably rounded, as illustrated at 18. The blank 10 is cut completely through from the face 14 to the face 16 along two perpendicular intersecting lines or planes 20 and 22 which extend diagonally across the blank and having their termini disposed in spaced, adjacent relationship to the corners 18.

It will be seen that the line of cut 20 divides the line of cut 22 into two halves 22a and 22b while the line of cut 22 divides the line of cut 20 into halves 20a and 20b, said halves being disposed on opposite sides of the intersection 24 of said lines.

The blank illustrated in FIGS. 1 and 2 may be desirably formed by a die-cutting operation, after which the blank is merely inverted or turned inside out to form the completed element shown in FIG. 3. The element of FIG. 3 will be seen to have a central opening 26 and a square outer periphery comprising sides 28, 30, 32 and 34 that intersect at corners or edges 36, 38, 40 and 42. The annular wall of the opening 26 is composed of sections which were previously the blank walls 12a, 12b, 12c and 12d. Side 28 is made up of the surfaces or walls formed by the line of cut 22b, side 30 is composed of walls formed by the line of cut 20a, side 32 is composed of the walls formed by line of cut 22a, and side 34 is made up of the walls formed by the line of cut 20b. As the blank 10 is initially formed, the corner 36 is disposed between the lines of cut 22b and 20b, the corner 38 is within the segment defined by the lines 20a and 22b, the corner 40 is located between the lines of cut 22a and 20a, and the corner 42 is within the segment defined by the lines of cut 20b and 22a.

It will be seen that the outside dimensions of the blank 10 as originally formed are smaller than the outside dimensions of the resultant element of FIG. 3. For this reason a greater number of filter elements can be made from a given sheet of material than in a method in which a filter element having the dimension of final product is cut directly from the sheet of material. This is because the present method makes use of material that was previously removed to form the opening 26 and was lost as scrap.

It should be pointed out that when the blank of FIGS. 1 and 2 is inverted to produce the shape of FIG. 3, portions of the material of the blank will be stretched and compressed. The material adjacent the corners 18 will be compressed while the material midway between the corners 18 will be stretched in a radially outward direction. While such stretching and compressing may not be sufficient to permit the material to assume the exact shape of FIG. 3, it will be reasonably close to such shape, and minor variations will be within the allowable dimensional tolerances of most applications. The elastic quality of foam rubber, foam polyurethane and other materials commonly used for air-cleaner elements helps in causing the blank to assume the desired shape when inverted. Furthermore, it is to be noted that such stretching and compressing tends to equalize the total quantity of material around all portions of the filter and thus the filtering efficiency of the element will be more nearly uniform around all parts thereof.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:
1. The method of making a centrally open article of porous compressible material which includes cutting a sheet of said material to form a blank having a polygonal outer periphery, cutting the blank along two intersecting lines having their termini spaced from the outer periphery of the blank, the point of intersection of said lines being generally in the middle of said blank and spaced from the opposite ends of said lines, and inverting the blank so that the wall sections of the blank formed by said lines of cut become the outer periphery of the finished article and the outer periphery of the blank becomes the opening of the finished article.

2. The method set forth in claim 1 wherein said two intersecting lines of cut extend along perpendicular paths.

3. The method of making a centrally open article from a blank of compressible porous material which includes cutting the blank along two lines intersecting one another generally at their mid-points, said lines of cut having their termini spaced from the outer periphery of the blank, and inverting the blank so that the walls of the blank formed by the intersecting lines of cut become the outer periphery of the finished article and the outer periphery of the blank becomes the opening of the finished article.

4. The method of making a centrally open article from a sheet of elastic porous material which includes cutting the sheet to form a blank having a polygonal outer periphery, cutting said blank along two intersecting lines having their termini spaced from the outer periphery of the blank with said lines of cut intersecting one another substantially at the mid-points thereof, and inverting the blank so that the wall sections of the blank formed by said lines of cut become the outer periphery of the finished article and the outer periphery of the blank becomes the opening of the finished article.

5. The method of making an air cleaner element having a central opening and a rectangular outer periphery which includes cutting a blank from a sheet of porous compressible material, cutting the blank along two lines which intersect one another substantially at the mid-points thereof, the termini of said lines of cut being spaced from the outer periphery of the blank, and inverting the blank so that the wall sections of the blank formed by said lines of cut become the outer periphery of the finished article and the outer periphery of the blank becomes the opening of the finished article.

6. The method set forth in claim 5 in which said intersecting lines of cut are arranged to extend diagonally across the blank and have their termini spaced from and adjacent to the corners of said blank.

7. The method set forth in claim 5 in which said blank is cut from a sheet of material having opposite parallel faces.

8. The method of making an air cleaner element having a central opening and a square outer periphery which includes cutting a blank of generally square shape from a sheet of porous compressible material, cutting the blank along two lines which intersect one another substantially at midpoints thereof, said lines being disposed perpendicular to one another and each extending diagonally across said blank between locations adjacent to and spaced from opposite corners of said blank, and inverting the blank so that the wall sections of the blank formed by said lines of cut become the outer periphery of the finished article and the outer periphery of the blank becomes the opening of the finished article.

References Cited by the Examiner
UNITED STATES PATENTS

| | | | |
|---|---|---|---|
| 649,204 | 5/00 | Grouvelle et al. | 113—118 |
| 1,487,292 | 3/24 | Tomkinson | 29—533 X |
| 1,526,911 | 2/25 | Kadel | 29—533 X |
| 1,716,462 | 6/29 | Reiter. | |
| 1,743,544 | 1/30 | Helberg | 113—116 |
| 2,558,185 | 6/51 | Leisen | 29—163.5 |
| 2,982,515 | 5/61 | Rule | 29—450 X |

WHITMORE A. WILTZ, *Primary Examiner.*

HYLAND BIZOT, *Examiner.*